Jan. 2, 1923.
S. STEVENS.
SPHERICAL BALL BEARING CASTER.
FILED SEPT. 21, 1920.
1,440,641
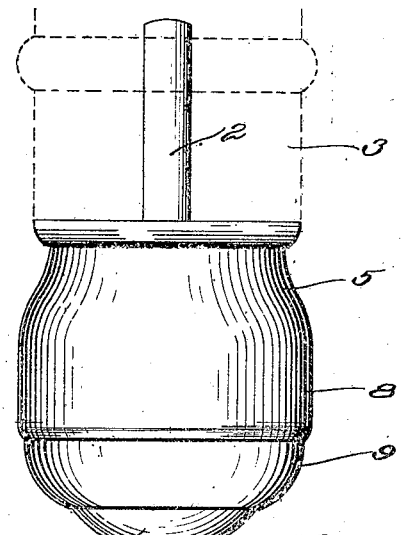
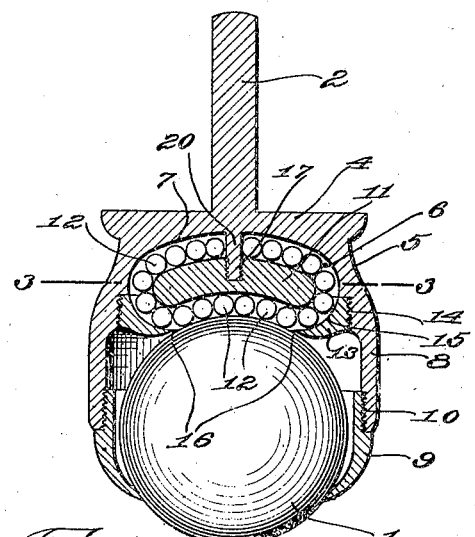
Fig. 1. Fig. 2.
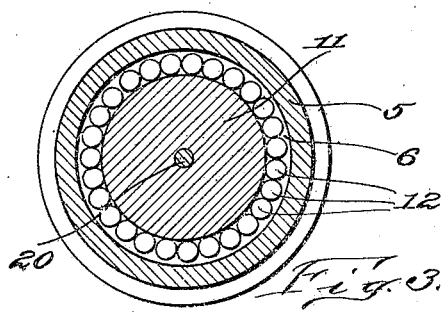
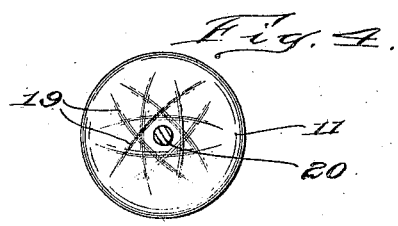
Fig. 3. Fig. 4.
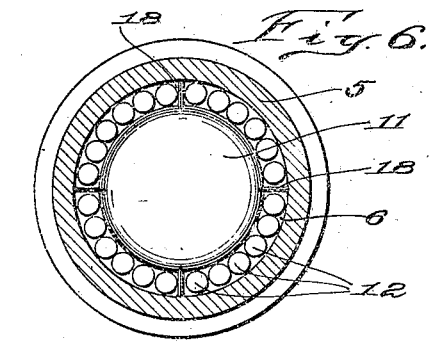
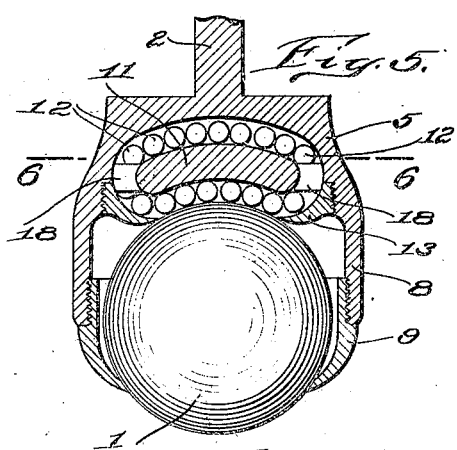
Fig. 6. Fig. 5.
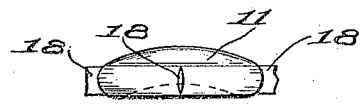
Fig. 7.
*Inventor:*
Sidney Stevens
by Macleod, Calver, Copeland & Dike
*Attys*

Patented Jan. 2, 1923.

1,440,641

UNITED STATES PATENT OFFICE.

SIDNEY STEVENS, OF MILLINOCKET, MAINE.

SPHERICAL BALL-BEARING CASTER.

Application filed September 21, 1920. Serial No. 411,781.

*To all whom it may concern:*

Be it known that I, SIDNEY STEVENS, a citizen of the United States, residing at Millinocket, county of Penobscot, State of Maine, have invented a certain new and useful Improvement in Spherical Ball-Bearing Casters, of which the following is a specification, reference being had therein to the accompanying drawings.

The invention relates to an improvement in spherical ball-bearing casters. The object of the invention is to produce a spherical ball-bearing caster which will enable the sphere to rotate in any direction with sufficient freedom so that at no time will the sphere drag upon the surface with which it bears. It is especially intended for use in connection with articles of furniture, such for instance as beds, tables, chairs, couches, side-boards, pianos, etc., although it is well adapted for use in connection with trucks and with machinery where its peculiar faculty of turning in any direction would particularly adapt it for use.

The invention will be fully understood from the following description when taken in connection with the accompanying drawings, and the novel features thereof will be pointed out and clearly defined in the claims at the close of this specification.

In the drawings, Fig. 1 is a view in elevation of a caster embodying the invention connected with the leg of a piece of furniture.

Fig. 2 is a section on line 2—2 of Fig. 1.

Fig. 3 is a section on line 3—3 of Fig. 2.

Fig. 4 is a plan view of the bulb around which the balls for the bearing are to be assembled.

Fig. 5 is a sectional view showing a modified form of the device embodying the invention.

Fig. 6 is a section on line 6—6 of Fig. 5.

Fig. 7 is a plan view of the bulb employed in the modified form of device.

Referring now to the drawings, 1 represents the sphere which is mounted in a suitable holder embodying the invention having a spindle 2 which is adapted to be engaged with a socket in a leg or foot-piece 3 of the piece of furniture or other article with which the caster is to be employed. Connected with the spindle 2 is the head 4 of the holder member, which has a downwardly extending shell portion 5, said shell portion being formed with a chamber 6 which is circular in horizontal cross section and has an arched top 7. Below the chamber 6, the said shell has a further downwardly extending annular portion 8 which is of somewhat greater diameter than the diameter of the sphere 1. Detachably connected with said annular portion 8 is a clamping ring 9 which is connected with the said annular portion 8 of the shell after the sphere 1 is introduced within the shell, the purpose of said clamp being to hold the sphere in place. The said clamping ring 9 preferably has a screw-threaded connection 10 with the shell member 8 so that it can be adjustable as well as detachable to admit the sphere. The said clamping ring 9 is curved inward towards its lower ends, so that the opening at the lower end is of less diameter than the diameter of the sphere while the diameter of the upper end of the ring is somewhat greater than the diameter of the sphere. The contracted lower end of the ring should just barely contact with the sphere throughout its periphery at some distance below the center of the sphere, so as to hold it from falling out and from rattling around, but at the same time allowing it freedom of motion.

A bulb 11, as I have termed it, is secured centrally within the chamber of the shell 5, said bulb being of any suitable material. It is circular in plan view, as shown in Figure 4, and is concave on its under side and convex on its upper side in vertical section in all radial directions and is concentric with the sphere 1 as shown in Figure 2. Its periphery is also on the arc of a circle in vertical section, as shown in Figure 2. The diameter of the bulb is sufficiently less than the diameter of the chamber 6 to form a space between the bulb 11 and the wall of the chamber 6, to receive the ball-bearings 12 which entirely surround the bulb. In order to close the bottom of the ball-bearing chamber between the sphere and the shell 5, a ring 13 is screwed into the shell as shown at 14, said ring 13 having a concaved upper face 15 which follows the curve of the concaved wall of the chamber and reaches around to form a support for a portion of the balls, but the ring must not touch the sphere. Within the space surrounded by the inner edge 16 of the ring 13 the balls will rest directly on the sphere. All of the rest of the balls will be out of contact with the sphere.

The entire downward pressure of the article supported by the casters will be vertically downward upon the balls which rest upon the sphere within the space surrounded by the inner periphery 16 of the ring 13. This set of balls which sustains the weight are arranged in a circular group on the under side of the concaved under surface of the bulb 11, so that the sphere 1 can readily roll in any direction. As viewed in Figure 2 which shows a central sectional view of the bulb, there are shown six of the balls 12 in engagement with the sphere, but the entire number of balls in engagement with the sphere will be as many as could be enclosed in the circle whose diameter is equal to the combined diameter of six of the balls.

The preferred means of securing the head 4 of the shell to the bulb is shown in Figure 2 and consists of a screw-threaded stem 17 which screws into the bulb, as shown in Figure 2. Any other suitable form of connection, however, may be employed. One other form is shown in Figures 5, 6 and 7, in which the bulb is connected with the inner periphery of the shell 5 by four thin pointed pieces 18 which project from the shell 5 radially inward into engagement with the bulb.

Preferably the bulb 11 is formed with a series of shallow grooves 19 crossing one another in various directions on its surface as shown in Figure 4, to aid the balls in running to the right and to the left of the spindle 20. These grooves should preferably all be curved on the arc of a circle, although they cross each other at various angles.

What I claim is:—

1. In combination with a spherical caster, a mount therefor having a chamber above the sphere, said chamber being concave in vertical section and circular in horizontal section, and having a bulb suspended in the middle of the chamber, said bulb being circular in plan view and concave on its lower face and convex on its upper face, and being of sufficiently less diameter than the chamber so that there is formed a continuous ball bearing space around the bulb at the top and bottom and sides, the periphery of the bulb being convex in vertical section so that the ball passage has a continuous curve from the upper to the under side as well as around the periphery, and ball bearings filling said chamber, the balls on the under side of the bulb bearing on the surface of the sphere, the ball passage being only of sufficient height on the upper and underside of the bulb and of sufficient width at the edge of the bulb to permit free movement of the balls without any overlapping of the balls on one another.

2. In combination with a spherical caster, a mount therefore having a chamber above the sphere, said chamber being concave in vertical section and circular in horizontal section, and having a bulb suspended in the middle of the chamber, said bulb being circular in plan view and concave on its lower face and convex on its upper face, and being of sufficiently less diameter than the chamber, so that there is formed a continuous ball bearing space at the top and bottom and edge of the bulb, and the walls of the ball bearing space being curved in all parts, the upper face of the bulb being formed with curved grooves to aid in guiding the circulatory movement of the balls.

In testimony whereof I affix my signature.

SIDNEY STEVENS.